United States Patent [19]

Marshall

[11] Patent Number: 5,068,891
[45] Date of Patent: Nov. 26, 1991

[54] CREDIT CONTROL SYSTEM FOR LONG DISTANCE TELEPHONE SERVICES

[76] Inventor: Marvin Marshall, 13014 N. Dale Mabry, Tampa, Fla. 33618

[21] Appl. No.: 359,200

[22] Filed: May 31, 1989

[51] Int. Cl.$^5$ .......................................... H04M 17/02
[52] U.S. Cl. ........................................ 379/91; 379/144
[58] Field of Search ........................ 379/91, 144, 207

[56] References Cited

U.S. PATENT DOCUMENTS

| | | | |
|---|---|---|---|
| 4,232,199 | 11/1980 | Boatwright et al. | 379/197 |
| 4,577,061 | 3/1986 | Katzeff et al. | 379/144 |
| 4,611,096 | 9/1986 | Asmuth et al. | 379/207 |
| 4,685,127 | 8/1987 | Miller et al. | 379/221 |
| 4,706,275 | 11/1987 | Kamil | 379/144 |
| 4,782,519 | 11/1988 | Patel et al. | 379/221 |
| 4,791,640 | 12/1988 | Sand | 370/58 |

OTHER PUBLICATIONS

S. B. Weinstein, "Smart Credit Cards: The Answer to Cashless Shopping", IEEE Spectrum, 2/1984, pp. 43–49.

Primary Examiner—Jin F. Ng
Assistant Examiner—Wing F. Chan
Attorney, Agent, or Firm—Joseph C. Mason; Ronald E. Smith

[57] ABSTRACT

The amount of credit available to a telephone travel card holder is determined immediately at the completion of a long distance call and the travel card is invalidated if no credit remains. Capture software captures call ticket data at the completion of a call and the ticket data is transmitted to a monitoring computer without delay. The monitoring computer calculates the amount of credit available to that caller and invalidates the travel card if no credit remains by transmitting a signal to all switching equipment stations throughout the telephone system.

15 Claims, 1 Drawing Sheet

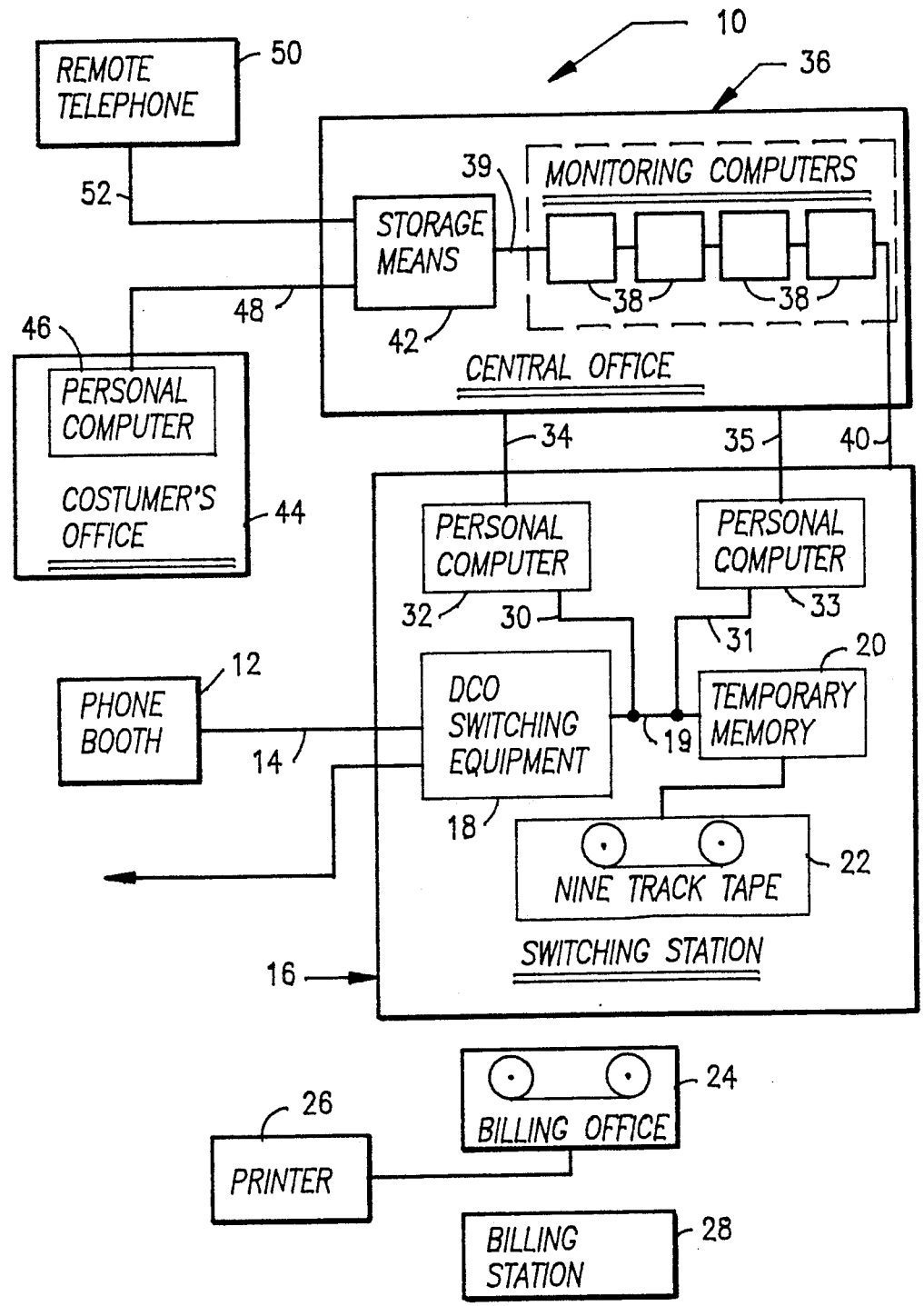

CREDIT CONTROL SYSTEM FOR LONG DISTANCE TELEPHONE SERVICES

TECHNICAL FIELD

This invention relates, generally, to telephone systems. More particularly, it relates to a telephone system that monitors the available credit of a long distance caller's travel card account to determine the amount of available credit remaining in the account immediately upon completion of a call.

BACKGROUND ART

Telephone travel cards, also known as telephone credit cards, are issued by telephone companies to customers believed to be credit worthy. The cards enable the caller to place long distance calls over any phone and to charge the call to the account of the cardholder.

The primary drawback of the present credit-control systems used by telephone companies is that they rely on a month-long billing cycle; in effect, credit is extended to the caller each time a call is made, even if the caller's credit worthiness is far less than the total charges on his or her bill.

Large telephone companies have invested significant capital into large main frame computer systems that collect and read data from switching equipment at monthly intervals. Specifically, most data collected from switching equipment is stored on nine track tape media at the switching station; to process the data from a nine track tape, human intervention is required, i.e., phone company personnel must physically remove each nine track tape from the switching equipment station each month and insert the tape into a processing computer. Thus, the amount of charges to a given account number are not known until the end of a billing cycle.

Unfortunately, a customer who has no intention to pay can run up enormous charges in one month of calling. The credit of the individual can then be cut off, but significant financial damage to the telephone company may have already occurred by then. With hundreds or even thousands of fraudulent callers using a phone company's credit cards, month after month, severe damage to the financial health of a telephone company can result.

Clearly, monitoring of a customer's credit on a per call basis is needed. If credit monitoring on a per call basis could be achieved, the travel card account number of a caller whose credit has been exceeded could be invalidated immediately upon completion of a call that reduced the caller's available credit to zero.

Unfortunately, the large telephone companies that have invested so much capital in main frame computers reliant upon switching equipment and once a month retrieval of nine track tapes are somewhat muscle bound and lack the flexibility to convert to monitoring of credit card calls on a per call basis. However, there are hundreds of small, independent long distance telephone companies that could convert to credit monitoring on a per call basis if the technology to do so were available.

More importantly, the art neither teaches nor suggests how a per call credit-monitoring system could be built. The realization that per call monitoring is needed is an important inventive step, but reducing the invention to practice cannot be accomplished by available equipment or software, nor can existing equipment and software be aggregated to produce the needed system.

A credit monitoring system of interest is shown in U.S. Pat. No. 4,706,275 to Kamil. However, the Kamil system replaces software at the existing switching equipment station. For this reason, it would not be feasible from an economic standpoint for a telephone company to convert to the Kamil system. Therefore, a credit monitoring system is needed that is outside of the existing system, i.e., transparent to the existing system. If an outside monitoring system could be provided, then the existing switching equipment would not need to be scrapped.

Real time screen displays of charges as they accumulate during a customer's call are described in U.S. Pat. Nos. 4,731,818 to Clark, Jr. et al., 3,784,793 to Ito et al., and an article in the 1984 volume of the Institute of Electrical and Electronic Engineers by Weinstein.

DISCLOSURE OF INVENTION

Two personal computers, one of which is a backup computer, are conductively coupled to pre-existing on site standard high capacity Digital Central Office (DCO) telephone switching systems. The computers are transparent to the conventional DCO switching equipment already in place. The dual computers are not attended by human operators, and are operated on a continuous, always "on" basis. Each computer, more specifically, is coupled to a telephone switch owned by a telephone company that has contractually secured the right to use the novel system disclosed herein. Each computer is further conductively coupled to a dedicated telephone line such as an FX line for the immediate high speed down-loading of gleaned data to the central office of the novel system.

The steps carried out by the computers are performed by novel software. In a nutshell, the inventive system operates as follows: a customer desiring to make a long distance call from a telephone other than one owned or leased by the customer dials an 800 number followed by the account number printed on the customer's travel card. The call is first handled by conventional switching equipment; the switching equipment completes the call by connecting the caller to the number dialed and simultaneously activates a timing means to record the temporal length of the call. The data concerning the call is sent to an internal buffer or memory means, in response to a poll from said buffer, for subsequent transmittal to a nine track tape which is picked up monthly by telephone company personnel for bill-preparation purposes.

The novel system intercepts or captures the call data immediately upon completion of a call. Importantly, the existing system is not affected in any way by the operation of the novel system. Moreover, the novel system is not reliant upon the polling of the DCO by the internal buffer means; capture software enables capture of the needed data immediately upon completion of a call as aforesaid.

The novel system employs a personal computer that receives the captured digital data from the conventional switching equipment through an interface means. The data is immediately sent by the personal computer through a communication port to a monitoring computer at a remote location.

The data includes information such as the temporal length of the call; the monitoring computers subtract the temporal length of the call from the amount of time available to the caller as determined by the amount of credit extended to that caller, and terminates the validity of the caller's credit card if the credit extended thereto has been exceeded.

In this manner, the available credit of a caller is determined on a per call basis and excessive charges beyond a given caller's assigned credit limit are prevented.

It is therefore understood that an important object of this invention is to provide a telephone credit card system that is not unreasonably subject to abuse.

The invention accordingly comprises the features of construction, combination of elements and arrangement of parts that will be exemplified in the descriptions set forth hereinafter and the scope of the invention will be set forth in the claims.

DESCRIPTION OF THE DRAWINGS

For a fuller understanding of the nature and objects of the invention, reference should be made to the following detailed description, taken in connection with the accompanying drawings, in which:

The FIGURE is a block diagram showing the novel system of this invention.

BEST MODES FOR CARRYING OUT THE INVENTION

Referring now to the FIGURE, it will there be seen that an embodiment that illustrates the teachings and suggestions of the present invention is denoted by the reference numeral 10 as a whole.

The present invention operates in the environment of a conventional telephone system and is transparent thereto, i.e., it does not affect the routine operation of the existing system. Just as importantly, the conventional system need not be modified in any way when the novel system is installed.

When a travel card call is made from a remote phone booth 12 equipped with Touch Tone automatic dialing means, an 800 inbound line 14 transmits the call to a switching station 16. Conventional DCO switching equipment 18 performs the following nine routine steps: 1) the integrity of the call is checked, i.e., the caller's account number is checked to determine whether the travel card is in good standing; 2) if the call integrity is verified, an analysis number is requested, i.e., a number is provided to numerically identify information to be collected about the call; 3) a route over the least expensive available routes is preselected; 4) the call is sent over the preselected route; 5) if the call is answered, a "seizure made" signal is generated, and if the call is not answered, a "seizure not made" signal is generated and the equipment is returned to its initial mode, waiting to check the integrity of the next incoming call; 6) when the seizure is made, i.e., when the call is answered, the month, day, year, hour, minute and second is noted. This time is the ticket start time, i.e., the meter for the call starts running; 7) when the call ends, a "seizure ended" signal is generated; 8) upon receipt of the "seizure ended" signal the month, day, year, hour, minute and second that the call ended is noted and the temporal length of the call is calculated to complete the ticket, i.e., billing data for the completed call; and 9) the completed call ticket data is sent over line 19 to an internal buffer, i.e., the data is sent to a temporary memory means 20. Buffer 20 polls the DCO periodically to trigger the transmission to it of the billing data.

In a conventional telephone system, the data concerning the completed call is periodically transmitted from buffer 20 to a completed call data storage means which conventionally is provided in the form of a nine track tape 22. More specifically, a RAM switch memory buffer is periodically tripped to cause temporary memory means or buffer 20 to send its contents to the nine track tape 22.

The personnel employed by the telephone company physically travel to switching station 16 periodically (usually once per month) to remove the nine track tapes 22; the tapes are then transported by the personnel to a billing office 24. Computers at the office 24 read the tape, calculate an amount owed by each person and drive a printer 26 that prepares a bill for each customer. The bills are then stuffed into envelopes and mailed to each customer at billing station 28.

The novel system eliminates the need to store the completed call ticket data in the nine track tapes, eliminates the monthly removal of the tapes and the transportation thereof to the billing office, and thereby eliminates the delay between billing cycles during which time the telephone company is vulnerable to travel card abuse.

Specifically, the novel system employs capture software available from Utility Computer Company of Monroe, Louisiana or Info Systems of San Antonio, Tex., to capture the completed call ticket data immediately upon completion of a call; there is no need to wait until it is transmitted over line 19 from switching equipment 18 to internal buffer 20. The capture software also places the ticket data in standard format. Moreover, the software also sends a "receipt acknowledged" signal to the x.25 board. Thus, the novel system is also not dependent upon the further transmittal of the call data from buffer 20 to tape 22; such subsequent transmittal is a delayed transmittal since it depends upon the periodic tripping of the RAM switch memory buffer as above-mentioned.

In the FIGURE the novel primary access line 30 is shown tying into line 19 which connects DCO equipment 18 and internal buffer 20; line 31 is a backup line and is also tied into line 30 as shown. The data is transmitted over line 19 from an RS-232 communications port and as such is in non-asynchronous protocol form. RS-232 ports are available from Tandy Corporation at Radio Shack outlets and other similar communication ports are available from Apple Corporation.

The captured data transmitted by the RS-232 communications port is converted into asynchronous protocol form by an x.25 board available from Western Digital Corporation. The board is installed in the mother board of a primary personal computer means 32 and serves as the interface means between the RS-232 communications port in the switching equipment 18 and the personal computer means 32. A second x.25 board performs the same function in backup personal computer means 33. The above-mentioned captured software is also installed in each personal computer means 32, 33. Preferably, the primary pc x.25 board is preset to be recognized as serial port no. 1.

The pc means 32, 33 are preferably IBM or IBM compatible pc's with 40 megabyte memory capacity, modified by the capture software and the x.25 board as aforesaid.

Moreover, the pc means 32, 33 are preferably positioned physically within the switching station 16; capture lines 30, 31 are tied only to the switching equipment real time access ports owned by a telephone company that has contractually secured the right to be serviced by the novel system.

Each pc means 32, 33 is further provided with a 2-way communication port, preferably an RS-232. Each port, not shown, is in continuous open communication with FX lines 34 (primary), 35 (backup). Line 34 transmits the completed call ticket data from pc means 32, or backup pc means 33 transmits the data over backup line 33 if the primary pc means 32 is down, to the central office 36 of the novel system.

Importantly, no time delays are in the novel system; specifically, the completed call ticket data captured by lines 30, 31 as soon as a call ends is instantaneously transmitted over line 34 to the central office 36, in keeping with the objective of attaining per call monitoring of travel card usage.

A bank of monitoring computers, collectively denoted 38, continuously receives the completed call data over line 34. The elapsed time of the completed call is deducted from the available time for that caller, which available time is determined by the credit extended to that customer by the telephone company. If that credit extended to the caller has been entirely expended at the completion of the call, the monitoring computer 38 in charge of that travel card account number transmits a signal over line 40 to switching equipment 18 at switching station 16. The signal instructs the equipment 18 that that travel card account number is no longer a valid number; thus, if a travel card call is thereafter attempted on that account number, the call integrity check will determine the invalid status of the incoming call and the call will not be completed.

Data collected by the monitoring computers 38 is stored chronologically in a storage means 42 which immediately sorts the incoming data by customer and by card or whatever sorting categories are desired. Conductor 39 interconnects computer 38 and said storage means 42.

The data storage means 42 provides still another important feature of this invention; it can be accessed not only by the telephone company but by the telephone company customer as well. Specifically, a customer's office 44 equipped with a pc computer means 46 is conductively coupled to data storage means 42 over conventional telephone line 48 (or an FX line if the customer so desires).

Thus, customer 44 has continuous and real time access, if desired, to its own travel card data; the customer's pc means 46 cannot access the travel card data of other customers, nor can it access switching equipment 18. If the customer does not require continuous real time access to its travel card data, suitable periodic polling means can be used. For example, the data storage means 42 could be polled by the customer at the end of each business day.

The customer may also access data storage means 42 from sites remote from office 44. Reference numeral 50 denotes a telephone remote from office 44; to learn the current status of his or her travel card, the card holder places a 900 call over line 52 to data storage means 42. Upon verifying the card holder's account number, the data storage means 42 retrieves the requested data and reports the amount of available time or credit to the customer by means of a voice digitalization computer. In this manner, the card holder need not have a pc means such as pc means 46 in his or her possession to learn the status of the travel card account.

Those skilled in the art of telecommunications can make and use the invention by making reference to the above description and drawing. However, there are a number of relatively minor modifications that are worth mentioning.

For example, the novel system is capable of monitoring numerous simultaneous calls but a particular independent telephone company may not be interested in monitoring all of its travel cards on a real time basis. Instead, the telephone company may have developed sufficient statistical data to identify the high risk travel card accounts and high risk calls as well. The capture software thus can be modified to cause the real time monitoring of only the high risk cards and the high risk calls; other low risk cards and calls would simply be monitored periodically in accordance with the conventional periodic removal of the nine track storage tapes 22.

Obviously, the backup computer 33 could be eliminated, or additional backup computers could be provided. Each computer at the switching station 16 should be provided with an automatic re-booting means.

Moreover, hard disc media can also play a part in the novel system, i.e., the capture software preferably sends the captured completed call data not only to the monitoring computers 38 over FX line 34 but also to a hard disc media as well for later recall by direct access or by polling from remote or local locations.

Those skilled in the art will also be aware that suitable modems such as the Hayes modem and RS-232 or other suitable communication ports are required at various locations throughout the novel system.

This invention clearly pioneers the art of real-time monitoring of telephone travel cards. Accordingly, the claims that follow are entitled to broad interpretation, as a matter of law.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A method for preventing telephone travel card abuse, comprising the steps of:

capturing data transmitted by a conventional, pre-existing switching equipment means, including information concerning the temporal length of a long distance telephone call, immediately upon completion of the call;

said step of capturing data including the step of capturing said data as it is transmitted between a switching equipment means and an internal buffer means;

immediately transmitting the captured data to a monitoring means;

immediately subtracting the temporal length of the call from the amount of time available to the caller as determined by the caller's line of credit; and immediately invalidating the caller's travel card account number if no amount of time is available to the caller after said subtraction.

2. The method of claim 1, wherein the step of capturing data includes the step of converting the capturing data transmitted by said switching equipment means from a first digital form to a second digital form so that said data transmitted in said first form by said switching equipment means may be transmitted to said monitoring means, said monitoring means capable of receiving data only in said second form.

3. The method of claim 2, wherein the step of converting the captured data includes the step of converting a non-asynchronous signal generated by said switching equipment means into an asynchronous signal.

4. The method of claim 1, wherein the step of immediately transmitting the captured data to a monitoring means includes the step of transmitting said data through a computer means communication port to said monitoring means over a dedicated telephone line that is always available to transmit data from said computer means communication port to said monitoring means.

5. The method of claim 4, wherein said subtracting step is performed by said monitoring means.

6. The method of claim 5, wherein said invalidating step is performed by signals sent to said switching equipment by said monitoring means.

7. A telephone system that routes calls to their respective destinations and which records the temporal extent of each completed call by transmitting data about each completed call from a switching equipment means to an internal buffer means, said system including means for retrieving said records on a predetermined periodic basis and said system including credit-based travel cards issued to customers, wherein the improvement comprises:

capturing means for intercepting call data at the completion of a call;

said capturing means being conductively coupled at a predetermined location to a conventional, pre-existing switching equipment means;

said predetermined location being between said switching equipment means and said internal buffer means;

monitoring means for analyzing data captured by said capturing means;

means for immediately transmitting intercepted data to said monitoring means; and means for invalidating a customer's travel card if said monitoring means determines that no amount of credit remains on a customer's travel card at the completion of a call.

8. The system of claim 7, further comprising data storage means for storing said captured data.

9. The system of claim 7, wherein said capturing means includes at least one computer means electrically connected between said switching equipment means and said internal buffer means. the step of transmitting said data through a computer means communication port to said monitoring means over a dedicated telephone line that is always available to transmit data from said computer means communication port to said monitoring means.

10. The system of claim 9, wherein said means for immediately transmitting said intercepted data to said monitoring means includes a telephone line dedicated to said transmission so that no delay is encountered in transmitting said data.

11. The system of claim 10, wherein said means for immediately transmitting said intercepted data further includes a communication port means disposed in communication relation between said computer means and said monitoring means.

12. The system of claim 10, wherein said telephone line is an FX line.

13. The system of claim 9, wherein said capturing means includes a communication port means disposed in communicating relation between said switching equipment means and said computer means.

14. The system of claim 9, wherein said capturing means includes conversion means for converting a signal from said switching equipment means into a signal that can be received and analyzed by said computer means.

15. The system of claim 14, wherein said conversion means includes means for converting a non-asynchronous signal into an asynchronous signal.

* * * * *